US011539735B2

(12) United States Patent
Rao et al.

(10) Patent No.: US 11,539,735 B2
(45) Date of Patent: Dec. 27, 2022

(54) SYSTEMS AND METHODS FOR APPLICATION PLACEMENT IN A NETWORK BASED ON HOST SECURITY POSTURE

(71) Applicant: Cisco Technology, Inc., San Jose, CA (US)

(72) Inventors: Supreeth Hosur Nagesh Rao, Cupertino, CA (US); Navindra Yadav, Cupertino, CA (US); Prasannakumar Jobigenahally Malleshaiah, Sunnyvale, CA (US); Tapan Shrikrishna Patwardhan, Mountain View, CA (US); Umamaheswaran Arumugam, San Jose, CA (US); Darshan Shrinath Purandare, Fremont, CA (US); Aiyesha Ma, San Francisco, CA (US); Matthew Lawson Finn, II, Lebanon, GA (US)

(73) Assignee: Cisco Technology, Inc., San Jose, CA (US)

( * ) Notice: Subject to any disclaimer, the term of this patent is extended or adjusted under 35 U.S.C. 154(b) by 185 days.

(21) Appl. No.: 16/985,520

(22) Filed: Aug. 5, 2020

(65) Prior Publication Data

US 2022/0046045 A1 Feb. 10, 2022

(51) Int. Cl.
*H04L 9/40* (2022.01)
(52) U.S. Cl.
CPC ................ *H04L 63/1433* (2013.01)
(58) Field of Classification Search
CPC ... H04L 63/1433; G06F 9/5027; G06F 21/577
See application file for complete search history.

(56) References Cited

U.S. PATENT DOCUMENTS 8,631,458 B1 1/2014 Banerjee
9,069,969 B2 6/2015 Ayachitula et al.
(Continued)

FOREIGN PATENT DOCUMENTS

WO WO-2013164821 A2 * 11/2013 .......... G06F 21/552
WO WO-2016018289 A1 * 2/2016 .......... G06F 21/552
(Continued)

OTHER PUBLICATIONS

International Search Report and Written Opinion from the International Searching Authority, dated Oct. 28, 2021, 11 pages, for corresponding International Patent Application No. PCT/US2021/042990.
(Continued)

*Primary Examiner* — Sarah Su
(74) *Attorney, Agent, or Firm* — Polsinelli

(57) ABSTRACT

Systems, methods, and computer-readable media for application placement can include the following processes. A security score service determines a respective security posture score for each of a plurality of candidate hosts of an enterprise network. A user then identify a set of performance parameters and security parameters for a host in an enterprise network to execute a workload thereon. An application placement engine selects a host from the plurality of candidate hosts having a security posture score matching the performance parameters and the security parameters for executing the workload. An application deployment engine places the workload on the host.

20 Claims, 6 Drawing Sheets

(56) References Cited

U.S. PATENT DOCUMENTS

| | | | |
|---|---|---|---|
| 9,674,211 B2 | 6/2017 | Curcic et al. | |
| 9,973,525 B1* | 5/2018 | Roturier | H04L 63/1433 |
| 10,148,684 B2 | 12/2018 | Joy et al. | |
| 10,735,272 B1* | 8/2020 | Saurabh | G06F 21/566 |
| 2005/0108703 A1 | 5/2005 | Hellier | |
| 2006/0075503 A1* | 4/2006 | Bunker | G06F 21/604 |
| | | | 726/1 |
| 2016/0173520 A1* | 6/2016 | Foster | G06F 21/316 |
| | | | 726/25 |
| 2016/0323258 A1* | 11/2016 | Novack | H04L 63/1433 |
| 2016/0359917 A1* | 12/2016 | Rao | H04L 61/2007 |
| 2016/0381064 A1* | 12/2016 | Chan | H04L 51/12 |
| | | | 726/25 |
| 2017/0063898 A1* | 3/2017 | Muddu | G06N 7/005 |
| 2018/0278642 A1 | 9/2018 | Joy et al. | |
| 2019/0230098 A1* | 7/2019 | Navarro | G06F 16/907 |
| 2019/0260804 A1* | 8/2019 | Beck | H04L 63/1433 |
| 2019/0289029 A1* | 9/2019 | Chawla | H04L 63/1425 |
| 2020/0162485 A1* | 5/2020 | Jevans | G06F 21/563 |
| 2021/0194924 A1* | 6/2021 | Heinemeyer | H04L 63/1483 |
| 2022/0012340 A1* | 1/2022 | Rao | H04L 63/20 |
| 2022/0046046 A1* | 2/2022 | Rao | H04L 63/1416 |
| 2022/0053011 A1* | 2/2022 | Rao | H04L 63/1408 |
| 2022/0224723 A1* | 7/2022 | Crabtree | G06F 16/2477 |

FOREIGN PATENT DOCUMENTS

| | | | | |
|---|---|---|---|---|
| WO | WO-2018164701 A1 * | 9/2018 | | G06N 20/20 |
| WO | 2019/207486 | 10/2019 | | |
| WO | 2019/228717 | 12/2019 | | |
| WO | WO-2020210538 A1 * | 10/2020 | | G06F 16/24537 |
| WO | WO-2021173581 A * | 9/2021 | | G06N 5/025 |

OTHER PUBLICATIONS

"Policy based secure workload allocation in a distributed computing environment," Jun. 17, 2009, 3 pages.

* cited by examiner

SYSTEMS AND METHODS FOR APPLICATION PLACEMENT IN A NETWORK BASED ON HOST SECURITY POSTURE

TECHNICAL FIELD

The subject matter of this disclosure relates in general to the field of workload placement, and more specifically to selecting a host in a network to place and execute an application on, where the host is selected based on an analysis of a security posture of the host.

BACKGROUND

An enterprise application is a set of workloads (e.g., computing, networking, and storage) that are generally distributed across various nodes (or hosts) of a network. Selecting the right hosts for each workload is critical to the efficient operation of the whole enterprise application. Currently there is no process by which a comprehensive analysis of the security posture of any candidate node is performed in the host selection process.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
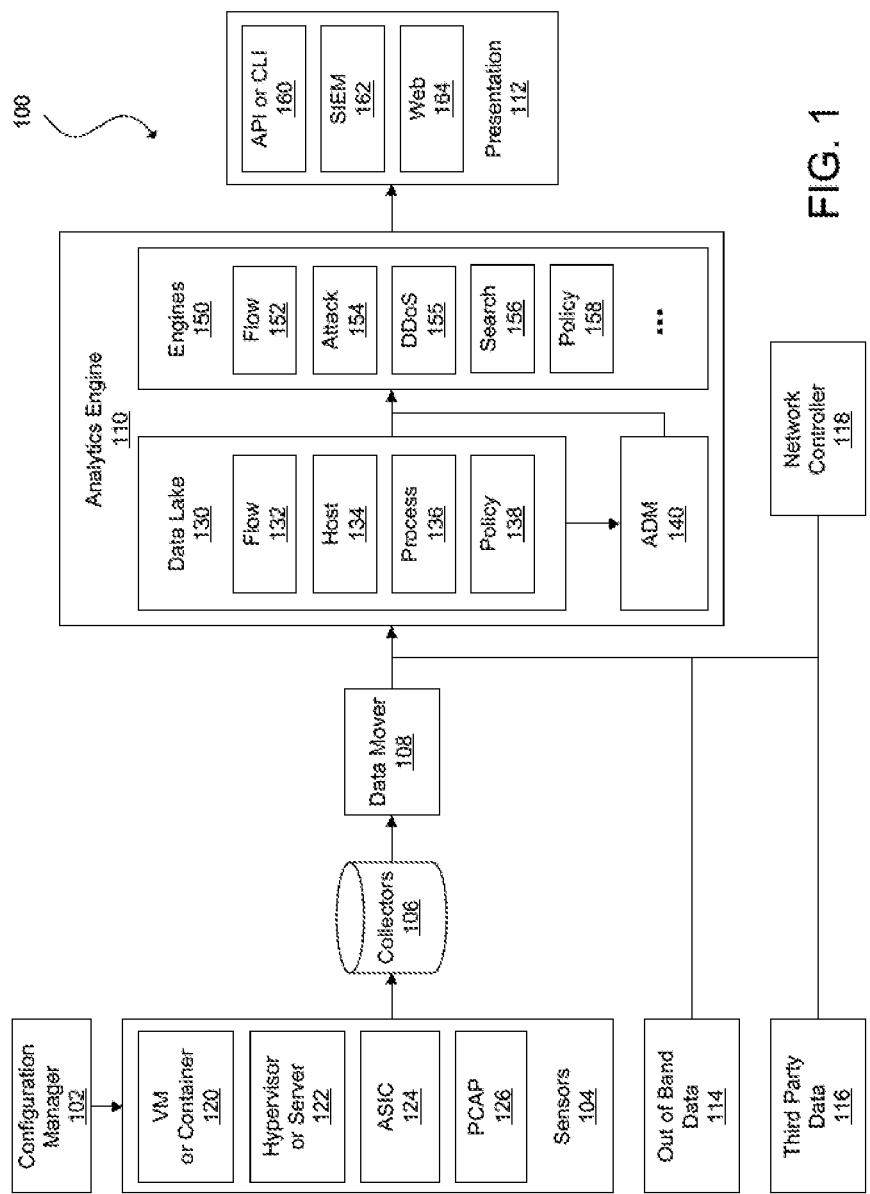
FIG. 1 illustrates an example of a network traffic monitoring system, according to one aspect of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Aspects of the subject technology relate to application placement based on a respective posture score (which may also be referred to as a security posture score) for the host. The posture score provides host specific performance and security assessment and a corresponding neighborhood security assessment. Once a set of performance parameters and security parameters for a host to execute a workload thereon is identified, a host that matches the set of performance parameters and security parameters can be selected from a group of candidate hosts. Thus, the application can be placed to a host that matches the specific security requirements of the application.

In one aspect, a method includes, determining a respective security posture score for each of a plurality of candidate hosts of an enterprise network; identifying a set of performance parameters and security parameters for a host in an enterprise network to execute a workload thereon; selecting a host from the plurality of candidate hosts having a security posture matching the performance parameters and the security parameters for executing the workload; and placing the workload on the host.

In another aspect, the respective security posture for each of the plurality of candidate hosts is determined based on one or more of a number of open ports for a corresponding candidate host, current or scheduled processes executed on the corresponding candidate host, geo-specific risks associated with the corresponding candidate host, flows associated with the corresponding host and a security score of the corresponding candidate host.

In another aspect, the respective security posture score for each of the plurality of candidate hosts is further determined based on a corresponding neighborhood security assessment of a neighborhood associated with a candidate host.

In another aspect, the set of performance parameters and security parameters identify a desired processing capacity, a desired host availability and a desired security specification for the host.

In another aspect, identifying the set of performance and security parameters includes receiving the set of performance and security parameters via a terminal coupled to the enterprise network.

In another aspect, identifying the set of performance and security parameters is automatically determined.

In another aspect, the method further includes presenting a set of candidate hosts for selection on a terminal coupled to the enterprise network; and receiving a selection of the host via the terminal.

In one aspect, an application placement system includes: one or more processors; and at least one computer-readable storage medium having stored therein instructions which, when executed by the one or more processors, cause the one or more processors to: determine, by a security score service, a respective security posture score for each of a plurality of candidate hosts of an enterprise network; identify, by a user, a set of performance parameters and security parameters for a host in an enterprise network to execute a workload thereon; select, by an application placement engine, a host from the plurality of candidate hosts having a security posture score matching the performance parameters and the security parameters for executing the workload; and place, by an application deployment engine, the workload on the host.

In one aspect, a non-transitory computer-readable storage medium including instructions which, when executed by one or more processors of an application placement system, cause the application placement system to: determine a respective security posture score for each of a plurality of candidate hosts of an enterprise network; identify a set of performance parameters and security parameters for a host in an enterprise network to execute a workload thereon; select a host from the plurality of candidate hosts having a security posture matching the performance parameters and the security parameters for executing the workload; and place the workload on the host.

DESCRIPTION

Various embodiments of the disclosure are discussed in detail below. While specific implementations are discussed, it should be understood that this is done for illustrative purposes only. A person skilled in the relevant art will recognize that other components and configurations may be used without departing from the spirit and scope of the disclosure.

Current application placement is based on availability of the host. To evaluate availability factors such as the available memory of the host, a required set of performance parameters of the application to be placed. If there are a number of available hosts to place an application, there is a lack of other criteria to further distinguish between these available hosts to find the best one. Specifically, there is a lack of criteria based on host security for such host selection.

The disclosed technology improves the process of placing application workloads across hosts in an enterprise network. One example improvement provided here is the automatic selection of the host based on a security posture determined for a number of candidate hosts. The security posture may be determined, as will be described below, based on a variety of factors including, but not limited to, open ports, flows, processes, host and neighborhood vulnerabilities as well as geo-location of each host. A host from among the candidate hosts is then selected for placing application workload thereon.

The disclosure begins with a description of examples of network monitoring system and example network environment in which concepts of application placement, as mentioned above, may be deployed.

Referring now to the drawings, FIG. 1 illustrates an example of a network traffic monitoring system, according to one aspect of the present disclosure. The network traffic monitoring system 100 can include a configuration manager 102, sensors 104, a collector module 106, a data mover module 108, an analytics engine 110, and a presentation module 112. In FIG. 1, the analytics engine 110 is also shown in communication with out-of-band data sources 114, third party data sources 116, and a network controller 118.

The configuration manager 102 can be used to provision and maintain the sensors 104, including installing sensor software or firmware in various nodes of a network, configuring the sensors 104, updating the sensor software or firmware, among other sensor management tasks. For example, the sensors 104 can be implemented as virtual partition images (e.g., virtual machine (VM) images or container images), and the configuration manager 102 can distribute the images to host machines. In general, a virtual partition may be an instance of a VM, container, sandbox, or other isolated software environment. The software environment may include an operating system and application software. For software running within a virtual partition, the virtual partition may appear to be, for example, one of many servers or one of many operating systems executed on a single physical server. The configuration manager 102 can instantiate a new virtual partition or migrate an existing partition to a different physical server. The configuration manager 102 can also be used to configure the new or migrated sensor.

The configuration manager 102 can monitor the health of the sensors 104. For example, the configuration manager 102 may request for status updates and/or receive heartbeat messages, initiate performance tests, generate health checks, and perform other health monitoring tasks. In some embodiments, the configuration manager 102 can also authenticate the sensors 104. For instance, the sensors 104 can be assigned a unique identifier, such as by using a one-way hash function of a sensor's basic input/out system (BIOS) universally unique identifier (UUID) and a secret key stored by the configuration image manager 102. The UUID can be a large number that may be difficult for a malicious sensor or other device or component to guess. In some embodiments, the configuration manager 102 can keep the sensors 104 up to date by installing the latest versions of sensor software and/or applying patches. The configuration manager 102 can obtain these updates automatically from a local source or the Internet.

The sensors 104 can reside on various nodes of a network, such as a virtual partition (e.g., VM or container) 120; a hypervisor or shared kernel managing one or more virtual partitions and/or physical servers 122, an application-specific integrated circuit (ASIC) 124 of a switch, router, gateway, or other networking device, or a packet capture (pcap) 126 appliance (e.g., a standalone packet monitor, a device connected to a network devices monitoring port, a device connected in series along a main trunk of a datacenter, or similar device), or other element of a network. The sensors 104 can monitor network traffic between nodes, and send network traffic data and corresponding data (e.g., host data, process data, user data, etc.) to the collectors 106 for storage. For example, the sensors 104 can sniff packets being sent over its hosts' physical or virtual network interface card (NIC), or individual processes can be configured to report network traffic and corresponding data to the sensors 104. Incorporating the sensors 104 on multiple nodes and within multiple partitions of some nodes of the network can provide for robust capture of network traffic and corresponding data from each hop of data transmission. In some embodiments, each node of the network (e.g., VM, container, or other virtual partition 120, hypervisor, shared kernel, or physical server 122, ASIC 124, pcap 126, etc.) includes a respective sensor 104. However, it should be understood that various software and hardware configurations can be used to implement the sensor network 104.

As the sensors 104 capture communications and corresponding data, they may continuously send network traffic data to the collectors 106. The network traffic data can include metadata relating to a packet, a collection of packets, a flow, a bidirectional flow, a group of flows, a session, or a network communication of another granularity. That is, the network traffic data can generally include any information describing communication on all layers of the Open Systems Interconnection (OSI) model. For example, the network traffic data can include source/destination MAC address, source/destination IP address, protocol, port number, etc. In some embodiments, the network traffic data can also include summaries of network activity or other network statistics such as number of packets, number of bytes, number of flows, bandwidth usage, response time, latency, packet loss, jitter, and other network statistics.

The sensors 104 can also determine additional data for each session, bidirectional flow, flow, packet, or other more granular or less granular network communication. The additional data can include host and/or endpoint information, virtual partition information, sensor information, process information, user information, tenant information, application information, network topology, application dependency mapping, cluster information, or other information corresponding to each flow.

In some embodiments, the sensors 104 can perform some preprocessing of the network traffic and corresponding data before sending the data to the collectors 106. For example, the sensors 104 can remove extraneous or duplicative data or they can create summaries of the data (e.g., latency, number of packets per flow, number of bytes per flow, number of flows, etc.). In some embodiments, the sensors 104 can be configured to only capture certain types of network information and disregard the rest. In some embodiments, the sensors 104 can be configured to capture only a representative sample of packets (e.g., every 1,000th packet or other suitable sample rate) and corresponding data.

Since the sensors 104 may be located throughout the network, network traffic and corresponding data can be collected from multiple vantage points or multiple perspectives in the network to provide a more comprehensive view of network behavior. The capture of network traffic and corresponding data from multiple perspectives rather than just at a single sensor located in the data path or in communication with a component in the data path, allows the data to be correlated from the various data sources, which may be used as additional data points by the analytics engine 110. Further, collecting network traffic and corresponding data from multiple points of view ensures more accurate data is captured. For example, other types of sensor networks may be limited to sensors running on external-facing network devices (e.g., routers, switches, network appliances, etc.) such that east-west traffic, including VM-to-VM or container-to-container traffic on a same host, may not be monitored. In addition, packets that are dropped before traversing a network device or packets containing errors may not be accurately monitored by other types of sensor networks. The sensor network 104 of various embodiments substantially mitigates or eliminates these issues altogether by locating sensors at multiple points of potential failure. Moreover, the network traffic monitoring system 100 can verify multiple instances of data for a flow (e.g., source endpoint flow data, network device flow data, and endpoint flow data) against one another.

In some embodiments, the network traffic monitoring system 100 can assess a degree of accuracy of flow data sets from multiple sensors and utilize a flow data set from a single sensor determined to be the most accurate and/or complete. The degree of accuracy can be based on factors such as network topology (e.g., a sensor closer to the source may be more likely to be more accurate than a sensor closer to the destination), a state of a sensor or a node hosting the sensor (e.g., a compromised sensor/node may have less accurate flow data than an uncompromised sensor/node), or flow data volume (e.g., a sensor capturing a greater number of packets for a flow may be more accurate than a sensor capturing a smaller number of packets).

In some embodiments, the network traffic monitoring system 100 can assemble the most accurate flow data set and corresponding data from multiple sensors. For instance, a first sensor along a data path may capture data for a first packet of a flow but may be missing data for a second packet of the flow while the situation is reversed for a second sensor along the data path. The network traffic monitoring system 100 can assemble data for the flow from the first packet captured by the first sensor and the second packet captured by the second sensor.

As discussed, the sensors 104 can send network traffic and corresponding data to the collectors 106. In some embodiments, each sensor can be assigned to a primary collector and a secondary collector as part of a high availability scheme. If the primary collector fails or communications between the sensor and the primary collector are not otherwise possible, a sensor can send its network traffic and corresponding data to the secondary collector. In other embodiments, the sensors 104 are not assigned specific collectors but the network traffic monitoring system 100 can determine an optimal collector for receiving the network traffic and corresponding data through a discovery process. In such embodiments, a sensor can change where it sends it network traffic and corresponding data if its environments changes, such as if a default collector fails or if the sensor is migrated to a new location and it would be optimal for the sensor to send its data to a different collector. For example, it may be preferable for the sensor to send its network traffic and corresponding data on a particular path and/or to a particular collector based on latency, shortest path, monetary cost (e.g., using private resources versus a public resources provided by a public cloud provider), error rate, or some combination of these factors. In other embodiments, a sensor can send different types of network traffic and corresponding data to different collectors. For example, the sensor can send first network traffic and corresponding data related to one type of process to one collector and second network traffic and corresponding data related to another type of process to another collector.

The collectors 106 can be any type of storage medium that can serve as a repository for the network traffic and corresponding data captured by the sensors 104. In some embodiments, data storage for the collectors 106 is located in an in-memory database, such as dashDB from IBM®, although it should be appreciated that the data storage for the collectors 106 can be any software and/or hardware capable of providing rapid random access speeds typically used for analytics software. In various embodiments, the collectors 106 can utilize solid state drives, disk drives, magnetic tape drives, or a combination of the foregoing according to cost, responsiveness, and size requirements. Further, the collectors 106 can utilize various database structures such as a normalized relational database or a NoSQL database, among others.

In some embodiments, the collectors 106 may only serve as network storage for the network traffic monitoring system 100. In such embodiments, the network traffic monitoring system 100 can include a data mover module 108 for retrieving data from the collectors 106 and making the data available to network clients, such as the components of the analytics engine 110. In effect, the data mover module 108 can serve as a gateway for presenting network-attached storage to the network clients. In other embodiments, the collectors 106 can perform additional functions, such as organizing, summarizing, and preprocessing data. For example, the collectors 106 can tabulate how often packets of certain sizes or types are transmitted from different nodes of the network. The collectors 106 can also characterize the traffic flows going to and from various nodes. In some embodiments, the collectors 106 can match packets based on sequence numbers, thus identifying traffic flows and connection links. As it may be inefficient to retain all data indefinitely in certain circumstances, in some embodiments, the collectors 106 can periodically replace detailed network traffic data with consolidated summaries. In this manner, the collectors 106 can retain a complete dataset describing one period (e.g., the past minute or other suitable period of time), with a smaller dataset of another period (e.g., the previous 2-10 minutes or other suitable period of time), and progressively consolidate network traffic and corresponding data of other periods of time (e.g., day, week, month, year, etc.). In some embodiments, network traffic and corresponding data for a set of flows identified as normal or routine can be winnowed at an earlier period of time while a more complete data set may be retained for a lengthier period of time for another set of flows identified as anomalous or as an attack.

Computer networks may be exposed to a variety of different attacks that expose vulnerabilities of computer systems in order to compromise their security. Some network traffic may be associated with malicious programs or devices. The analytics engine 110 may be provided with examples of network states corresponding to an attack and network states corresponding to normal operation. The analytics engine 110 can then analyze network traffic and corresponding data to recognize when the network is under attack. In some embodiments, the network may operate within a trusted environment for a period of time so that the analytics engine 110 can establish a baseline of normal operation. Since malware is constantly evolving and changing, machine learning may be used to dynamically update models for identifying malicious traffic patterns.

In some embodiments, the analytics engine 110 may be used to identify observations which differ from other examples in a dataset. For example, if a training set of example data with known outlier labels exists, supervised anomaly detection techniques may be used. Supervised anomaly detection techniques utilize data sets that have been labeled as normal and abnormal and train a classifier. In a case in which it is unknown whether examples in the training data are outliers, unsupervised anomaly techniques may be used. Unsupervised anomaly detection techniques may be used to detect anomalies in an unlabeled test data set under the assumption that the majority of instances in the data set are normal by looking for instances that seem to fit to the remainder of the data set.

The analytics engine 110 can include a data lake 130, an application dependency mapping (ADM) module 140, and elastic processing engines 150. The data lake 130 is a large-scale storage repository that provides massive storage for various types of data, enormous processing power, and the ability to handle nearly limitless concurrent tasks or jobs. In some embodiments, the data lake 130 is implemented using the Hadoop® Distributed File System (HDFS™) from Apache® Software Foundation of Forest Hill, Md. HDFS™ is a highly scalable and distributed file system that can scale to thousands of cluster nodes, millions of files, and petabytes of data. HDFS™ is optimized for batch processing where data locations are exposed to allow computations to take place where the data resides. HDFS™ provides a single namespace for an entire cluster to allow for data coherency in a write-once, read-many access model. That is, clients can only append to existing files in the node. In HDFS™, files are separated into blocks, which are typically 64 MB in size and are replicated in multiple data nodes. Clients access data directly from data nodes.

In some embodiments, the data mover 108 receives raw network traffic and corresponding data from the collectors 106 and distributes or pushes the data to the data lake 130. The data lake 130 can also receive and store out-of-band data 114, such as statuses on power levels, network availability, server performance, temperature conditions, cage door positions, and other data from internal sources, and third party data 116, such as security reports (e.g., provided by Cisco® Systems, Inc. of San Jose, Calif., Arbor Networks® of Burlington, Mass., Symantec® Corp. of Sunnyvale, Calif., Sophos® Group plc of Abingdon, England, Microsoft® Corp. of Seattle, Wash., Verizon® Communications, Inc. of New York, N.Y., among others), geolocation data, IP watch lists, Whois data, configuration management database (CMDB) or configuration management system (CMS) as a service, and other data from external sources. In other embodiments, the data lake 130 may instead fetch or pull raw traffic and corresponding data from the collectors 106 and relevant data from the out-of-band data sources 114 and the third party data sources 116. In yet other embodiments, the functionality of the collectors 106, the data mover 108, the out-of-band data sources 114, the third party data sources 116, and the data lake 130 can be combined. Various combinations and configurations are possible as would be known to one of ordinary skill in the art.

Each component of the data lake 130 can perform certain processing of the raw network traffic data and/or other data (e.g., host data, process data, user data, out-of-band data or third party data) to transform the raw data to a form useable by the elastic processing engines 150. In some embodiments, the data lake 130 can include repositories for flow attributes 132, host and/or endpoint attributes 134, process attributes 136, and policy attributes 138. In some embodiments, the data lake 130 can also include repositories for VM or container attributes, application attributes, tenant attributes, network topology, application dependency maps, cluster attributes, etc.

The flow attributes 132 relate to information about flows traversing the network. A flow is generally one or more packets sharing certain attributes that are sent within a network within a specified period of time. The flow attributes 132 can include packet header fields such as a source address (e.g., Internet Protocol (IP) address, Media Access Control (MAC) address, Domain Name System (DNS) name, or other network address), source port, destination address, destination port, protocol type, class of service, among other fields. The source address may correspond to a first endpoint (e.g., network device, physical server, virtual partition, etc.) of the network, and the destination address may correspond to a second endpoint, a multicast group, or a broadcast domain. The flow attributes 132 can also include aggregate packet data such as flow start time, flow end time, number of packets for a flow, number of bytes for a flow, the union of TCP flags for a flow, among other flow data.

The host and/or endpoint attributes 134 describe host and/or endpoint data for each flow, and can include host and/or endpoint name, network address, operating system, CPU usage, network usage, disk space, ports, logged users, scheduled jobs, open files, and information regarding files and/or directories stored on a host and/or endpoint (e.g., presence, absence, or modifications of log files, configuration files, device special files, or protected electronic information). As discussed, in some embodiments, the host and/or endpoints attributes 134 can also include the out-of-band data 114 regarding hosts such as power level, temperature, and physical location (e.g., room, row, rack, cage door position, etc.) or the third party data 116 such as whether a host and/or endpoint is on an IP watch list or otherwise associated with a security threat, Whois data, or geocoordinates. In some embodiments, the out-of-band data 114 and the third party data 116 may be associated by process, user, flow, or other more granular or less granular network element or network communication.

The process attributes 136 relate to process data corresponding to each flow, and can include process name (e.g., bash, httpd, netstat, etc.), ID, parent process ID, path (e.g., /usr2/username/bin/, /usr/local/bin, /usr/bin, etc.), CPU utilization, memory utilization, memory address, scheduling information, nice value, flags, priority, status, start time, terminal type, CPU time taken by the process, the command that started the process, and information regarding a process owner (e.g., user name, ID, user's real name, e-mail address, user's groups, terminal information, login time, expiration date of login, idle time, and information regarding files and/or directories of the user).

The policy attributes 138 contain information relating to network policies. Policies establish whether a particular flow is allowed or denied by the network as well as a specific route by which a packet traverses the network. Policies can also be used to mark packets so that certain kinds of traffic receive differentiated service when used in combination with queuing techniques such as those based on priority, fairness, weighted fairness, token bucket, random early detection, round robin, among others. The policy attributes 138 can include policy statistics such as a number of times a policy was enforced or a number of times a policy was not enforced. The policy attributes 138 can also include associations with network traffic data. For example, flows found to be non-conformant can be linked or tagged with corresponding policies to assist in the investigation of non-conformance.

The analytics engine 110 may include any number of engines 150, including for example, a flow engine 152 for identifying flows (e.g., flow engine 152) or an attacks engine 154 for identify attacks to the network. In some embodiments, the analytics engine can include a separate distributed denial of service (DDoS) attack engine 155 for specifically detecting DDoS attacks. In other embodiments, a DDoS attack engine may be a component or a sub-engine of a general attacks engine. In some embodiments, the attacks engine 154 and/or the DDoS engine 155 can use machine learning techniques to identify security threats to a network. For example, the attacks engine 154 and/or the DDoS engine 155 can be provided with examples of network states corresponding to an attack and network states corresponding to normal operation. The attacks engine 154 and/or the DDoS engine 155 can then analyze network traffic data to recognize when the network is under attack. In some embodiments, the network can operate within a trusted environment for a time to establish a baseline for normal network operation for the attacks engine 154 and/or the DDoS.

The analytics engine 110 may further include a search engine 156. The search engine 156 may be configured, for example to perform a structured search, an NLP (Natural Language Processing) search, or a visual search. Data may be provided to the engines from one or more processing components.

The analytics engine 110 can also include a policy engine 158 that manages network policy, including creating and/or importing policies, monitoring policy conformance and non-conformance, enforcing policy, simulating changes to policy or network elements affecting policy, among other policy-related tasks.

The ADM module 140 can determine dependencies of applications of the network. That is, particular patterns of traffic may correspond to an application, and the interconnectivity or dependencies of the application can be mapped to generate a graph for the application (i.e., an application dependency mapping). In this context, an application refers to a set of networking components that provides connectivity for a given set of workloads. For example, in a three-tier architecture for a web application, first endpoints of the web tier, second endpoints of the application tier, and third endpoints of the data tier make up the web application. The ADM module 140 can receive input data from various repositories of the data lake 130 (e.g., the flow attributes 132, the host and/or endpoint attributes 134, the process attributes 136, etc.). The ADM module 140 may analyze the input data to determine that there is first traffic flowing between external endpoints on port 80 of the first endpoints corresponding to Hypertext Transfer Protocol (HTTP) requests and responses. The input data may also indicate second traffic between first ports of the first endpoints and second ports of the second endpoints corresponding to application server requests and responses and third traffic flowing between third ports of the second endpoints and fourth ports of the third endpoints corresponding to database requests and responses. The ADM module 140 may define an ADM for the web application as a three-tier application including a first EPG comprising the first endpoints, a second EPG comprising the second endpoints, and a third EPG comprising the third endpoints.

The presentation module 112 can include an application programming interface (API) or command line interface (CLI) 160, a security information and event management (SIEM) interface 162, and a web front-end 164. As the analytics engine 110 processes network traffic and corresponding data and generates analytics data, the analytics data may not be in a human-readable form or it may be too voluminous for a user to navigate. The presentation module 112 can take the analytics data generated by analytics engine 110 and further summarize, filter, and organize the analytics data as well as create intuitive presentations for the analytics data.

In some embodiments, the API or CLI 160 can be implemented using Hadoop® Hive from Apache® for the back end, and Java® Database Connectivity (JDBC) from Oracle® Corporation of Redwood Shores, Calif., as an API layer. Hive is a data warehouse infrastructure that provides data summarization and ad hoc querying. Hive provides a mechanism to query data using a variation of structured query language (SQL) that is called HiveQL. JDBC is an application programming interface (API) for the programming language Java®, which defines how a client may access a database.

In some embodiments, the SIEM interface 162 can be implemented using Kafka for the back end, and software provided by Splunk®, Inc. of San Francisco, Calif. as the SIEM platform. Kafka is a distributed messaging system that is partitioned and replicated. Kafka uses the concept of topics. Topics are feeds of messages in specific categories. In some embodiments, Kafka can take raw packet captures and telemetry information from the data mover 108 as input, and output messages to a SIEM platform, such as Splunk®. The Splunk® platform is utilized for searching, monitoring, and analyzing machine-generated data.

In some embodiments, the web front-end 164 can be implemented using software provided by MongoDB®, Inc. of New York, N.Y. and Hadoop® ElasticSearch from Apache® for the back-end, and Ruby on Rails™ as the web application framework. MongoDB® is a document-oriented NoSQL database based on documents in the form of JavaScript® Object Notation (JSON) with dynamic schemas. ElasticSearch is a scalable and real-time search and analytics engine that provides domain-specific language (DSL) full querying based on JSON. Ruby on Rails™ is model-view-controller (MVC) framework that provides default structures for a database, a web service, and web pages. Ruby on Rails™ relies on web standards such as JSON or extensible markup language (XML) for data transfer, and hypertext markup language (HTML), cascading style sheets, (CSS), and JavaScript® for display and user interfacing.

Although FIG. 1 illustrates an example configuration of the various components of a network traffic monitoring system, those of skill in the art will understand that the components of the network traffic monitoring system 100 or any system described herein can be configured in a number of different ways and can include any other type and number of components. For example, the sensors 104, the collectors 106, the data mover 108, and the data lake 130 can belong to one hardware and/or software module or multiple separate modules. Other modules can also be combined into fewer components and/or further divided into more components.

Figure 2:
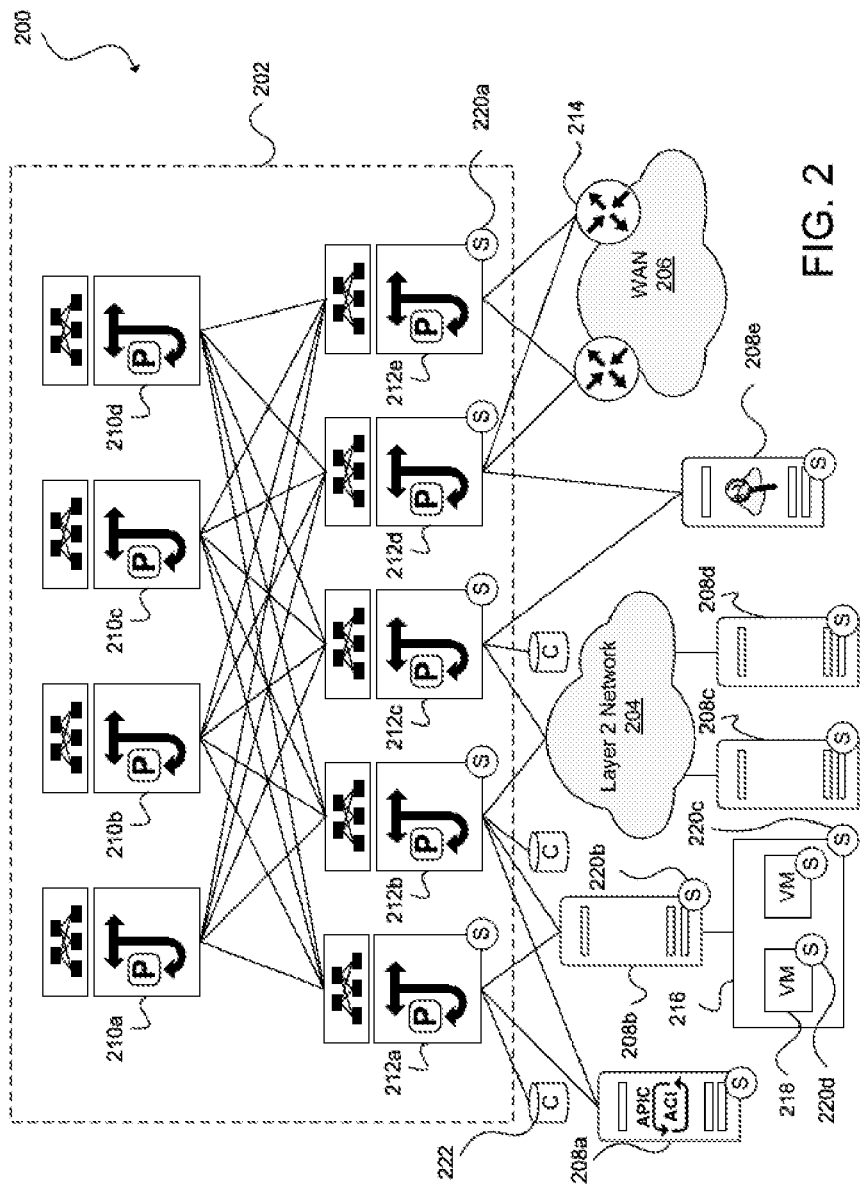
FIG. 2 illustrates an example of a network environment, according to one aspect of the present disclosure.

FIG. 2 illustrates an example of a network environment, according to one aspect of the present disclosure. In some embodiments, a network traffic monitoring system, such as the network traffic monitoring system 100 of FIG. 1, can be implemented in the network environment 200. It should be understood that, for the network environment 200 and any environment discussed herein, there can be additional or fewer nodes, devices, links, networks, or components in similar or alternative configurations. Embodiments with different numbers and/or types of clients, networks, nodes, cloud components, servers, software components, devices, virtual or physical resources, configurations, topologies, services, appliances, deployments, or network devices are also contemplated herein. Further, the network environment 200 can include any number or type of resources, which can be accessed and utilized by clients or tenants. The illustrations and examples provided herein are for clarity and simplicity.

The network environment 200 can include a network fabric 202, a Layer 2 (L2) network 204, a Layer 3 (L3) network 206, and servers 208a, 208b, 208c, 208d, and 208e (collectively, 208). The network fabric 202 can include spine switches 210a, 210b, 210c, and 210d (collectively, "210") and leaf switches 212a, 212b, 212c, 212d, and 212e (collectively, "212"). The spine switches 210 can connect to the leaf switches 212 in the network fabric 202. The leaf switches 212 can include access ports (or non-fabric ports) and fabric ports. The fabric ports can provide uplinks to the spine switches 210, while the access ports can provide connectivity to endpoints (e.g., the servers 208), internal networks (e.g., the L2 network 204), or external networks (e.g., the L3 network 206).

The leaf switches 212 can reside at the edge of the network fabric 202, and can thus represent the physical network edge. For instance, in some embodiments, the leaf switches 212d and 212e operate as border leaf switches in communication with edge devices 214 located in the external network 206. The border leaf switches 212d and 212e may be used to connect any type of external network device, service (e.g., firewall, deep packet inspector, traffic monitor, load balancer, etc.), or network (e.g., the L3 network 206) to the fabric 202.

Although the network fabric 202 is illustrated and described herein as an example leaf-spine architecture, one of ordinary skill in the art will readily recognize that various embodiments can be implemented based on any network topology, including any data center or cloud network fabric. Indeed, other architectures, designs, infrastructures, and variations are contemplated herein. For example, the principles disclosed herein are applicable to topologies including three-tier (including core, aggregation, and access levels), fat tree, mesh, bus, hub and spoke, etc. Thus, in some embodiments, the leaf switches 212 can be top-of-rack switches configured according to a top-of-rack architecture. In other embodiments, the leaf switches 212 can be aggregation switches in any particular topology, such as end-of-row or middle-of-row topologies. In some embodiments, the leaf switches 212 can also be implemented using aggregation switches.

Moreover, the topology illustrated in FIG. 2 and described herein is readily scalable and may accommodate a large number of components, as well as more complicated arrangements and configurations. For example, the network may include any number of fabrics 202, which may be geographically dispersed or located in the same geographic area. Thus, network nodes may be used in any suitable network topology, which may include any number of servers, virtual machines or containers, switches, routers, appliances, controllers, gateways, or other nodes interconnected to form a large and complex network. Nodes may be coupled to other nodes or networks through one or more interfaces employing any suitable wired or wireless connection, which provides a viable pathway for electronic communications.

Network communications in the network fabric 202 can flow through the leaf switches 212. In some embodiments, the leaf switches 212 can provide endpoints (e.g., the servers 208), internal networks (e.g., the L2 network 204), or external networks (e.g., the L3 network 206) access to the network fabric 202, and can connect the leaf switches 212 to each other. In some embodiments, the leaf switches 212 can connect endpoint groups (EPGs) to the network fabric 202, internal networks (e.g., the L2 network 204), and/or any external networks (e.g., the L3 network 206). EPGs are groupings of applications, or application components, and tiers for implementing forwarding and policy logic. EPGs can allow for separation of network policy, security, and forwarding from addressing by using logical application boundaries. EPGs can be used in the network environment 200 for mapping applications in the network. For example, EPGs can comprise a grouping of endpoints in the network indicating connectivity and policy for applications.

As discussed, the servers 208 can connect to the network fabric 202 via the leaf switches 212. For example, the servers 208a and 208b can connect directly to the leaf switches 212a and 212b, which can connect the servers 208a and 208b to the network fabric 202 and/or any of the other leaf switches. The servers 208c and 208d can connect to the leaf switches 212b and 212c via the L2 network 204. The servers 208c and 208d and the L2 network 204 make up a local area network (LAN). LANs can connect nodes over dedicated private communications links located in the same general physical location, such as a building or campus.

The WAN 206 can connect to the leaf switches 212d or 212e via the L3 network 206. WANs can connect geographically dispersed nodes over long-distance communications links, such as common carrier telephone lines, optical light paths, synchronous optical networks (SONET), or synchronous digital hierarchy (SDH) links. LANs and WANs can include L2 and/or L3 networks and endpoints.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective size of each network. The endpoints 208 can include any communication device or component, such as a computer, server, blade, hypervisor, virtual machine, container, process (e.g., running on a virtual machine), switch, router, gateway, host, device, external network, etc.

In some embodiments, the network environment 200 also includes a network controller running on the host 208a. The network controller is implemented using the Application Policy Infrastructure Controller (APIC™) from Cisco®. The APIC™ provides a centralized point of automation and management, policy programming, application deployment, and health monitoring for the fabric 202. In some embodiments, the APIC™ is operated as a replicated synchronized clustered controller. In other embodiments, other configurations or software-defined networking (SDN) platforms can be utilized for managing the fabric 202.

In some embodiments, a physical server 208 may have instantiated thereon a hypervisor 216 for creating and running one or more virtual switches (not shown) and one or more virtual machines 218, as shown for the host 208b. In other embodiments, physical servers may run a shared kernel for hosting containers. In yet other embodiments, the physical server 208 can run other software for supporting other virtual partitioning approaches. Networks in accordance with various embodiments may include any number of physical servers hosting any number of virtual machines, containers, or other virtual partitions. Hosts may also comprise blade/physical servers without virtual machines, containers, or other virtual partitions, such as the servers 208a, 208c, 208d, and 208e.

The network environment 200 can also integrate a network traffic monitoring system, such as the network traffic monitoring system 100 shown in FIG. 1. For example, the network traffic monitoring system of FIG. 2 includes sensors 220a, 220b, 220c, and 220d (collectively, "220"), collectors 222, and an analytics engine, such as the analytics engine 110 of FIG. 1, executing on the server 208e. The analytics engine 208e can receive and process network traffic data collected by the collectors 222 and detected by the sensors 220 placed on nodes located throughout the network environment 200. Although the analytics engine 208e is shown to be a standalone network appliance in FIG. 2, it will be appreciated that the analytics engine 208e can also be implemented as a virtual partition (e.g., VM or container) that can be distributed onto a host or cluster of hosts, software as a service (SaaS), or other suitable method of distribution. In some embodiments, the sensors 220 run on the leaf switches 212 (e.g., the sensor 220a), the hosts 208 (e.g., the sensor 220b), the hypervisor 216 (e.g., the sensor 220c), and the VMs 218 (e.g., the sensor 220d). In other embodiments, the sensors 220 can also run on the spine switches 210, virtual switches, service appliances (e.g., firewall, deep packet inspector, traffic monitor, load balancer, etc.) and in between network elements. In some embodiments, sensors 220 can be located at each (or nearly every) network component to capture granular packet statistics and data at each hop of data transmission. In other embodiments, the sensors 220 may not be installed in all components or portions of the network (e.g., shared hosting environment in which customers have exclusive control of some virtual machines).

As shown in FIG. 2, a host may include multiple sensors 220 running on the host (e.g., the host sensor 220b) and various components of the host (e.g., the hypervisor sensor 220c and the VM sensor 220d) so that all (or substantially all) packets traversing the network environment 200 may be monitored. For example, if one of the VMs 218 running on the host 208b receives a first packet from the WAN 206, the first packet may pass through the border leaf switch 212d, the spine switch 210b, the leaf switch 212b, the host 208b, the hypervisor 216, and the VM. Since all or nearly all of these components contain a respective sensor, the first packet will likely be identified and reported to one of the collectors 222. As another example, if a second packet is transmitted from one of the VMs 218 running on the host 208b to the host 208d, sensors installed along the data path, such as at the VM 218, the hypervisor 216, the host 208b, the leaf switch 212b, and the host 208d will likely result in capture of metadata from the second packet.

With examples of a monitoring system and a networking environment described above with reference to FIGS. 1 and 2, the disclosure now turns to examples of an application placement system that can be implemented via, for example, analytics engine 110 of FIG. 1, for selecting a host to place an application thereon. The selection of the host may be based on a security posture determined for a number of candidate hosts. The security posture may be determined, as will be described below, based on a variety of factors including, but not limited to, open ports, flows, processes, host and neighborhood vulnerabilities as well as geo-location of each host. A host from among the candidate hosts is then selected for placing application workload thereon.

Figure 3:
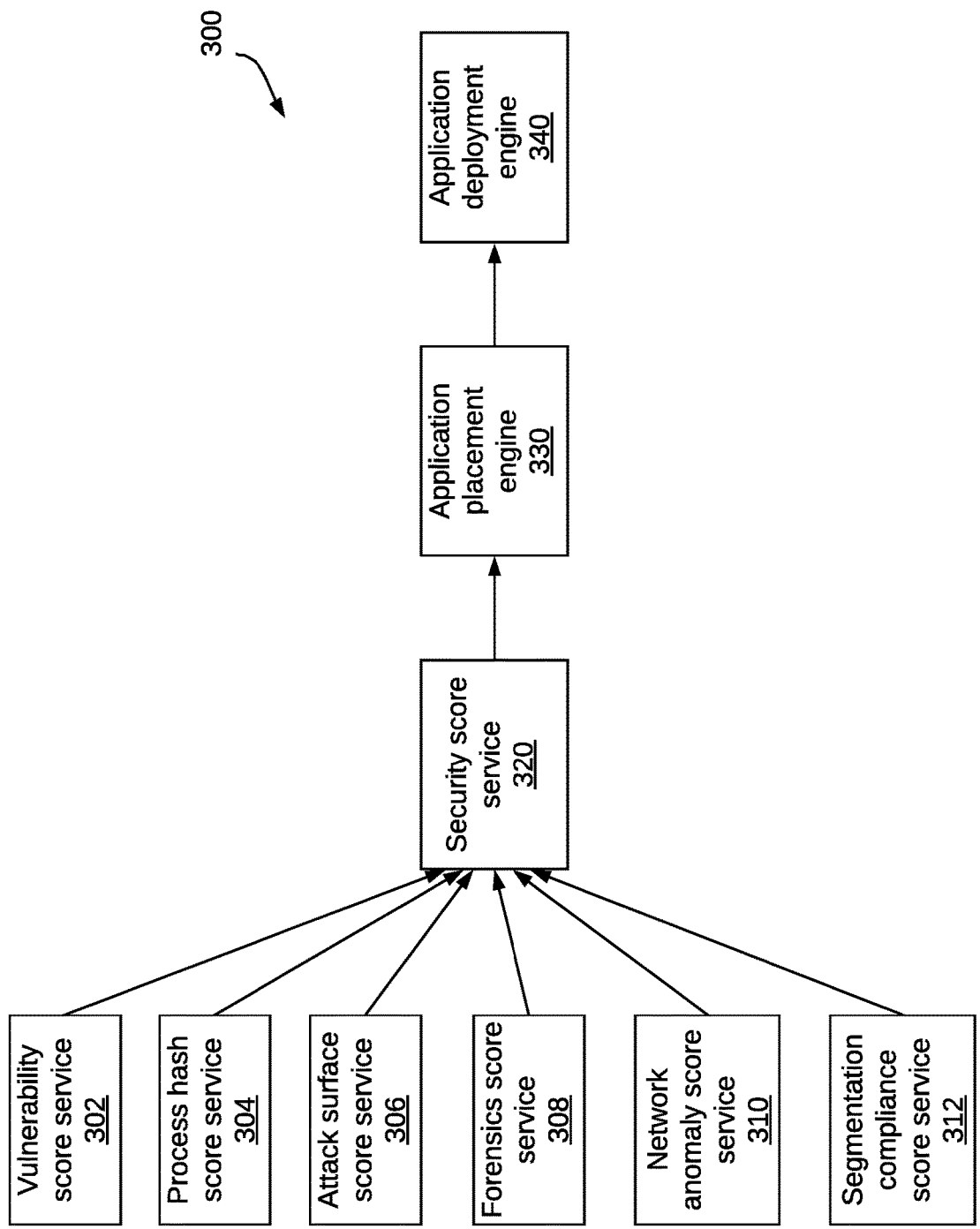
FIG. 3 illustrates an example of an application placement system based on security scores of the hosts, according to one aspect of the present disclosure.

FIG. 3 illustrates an example of an application placement system based on security scores of the hosts, according to one aspect of the present disclosure. The hosts include, but are not limited to any network node such as network server, a virtual machine, a container, etc. In some examples, the application placement system 300 can be directed by a network traffic monitoring system, such as the network traffic monitoring system 100 of FIG. 1; an analytics engine, such as the analytics engine 110 of FIG. 1; or other network service or network appliance. For example, an analytics engine 110, an engine 150 or any of engines included therein, can be configured to calculate different components of a security score, calculate the overall security posture score for a given host and its neighboring hosts, select a host based on a posture requirement, and place the application on the host. For example, the calculation of the security score can also be based on data collected by sensors 104 and 220.

According to some examples, each of the vulnerability score service 302, process hash score service 304, attack surface score service 306, forensics score service 308, network anomaly score service 310, segmentation compliance score service 312, and security score service 320 may be a set of computer-readable instructions that can be executed by engines 150 or its components to calculate a corresponding score.

The vulnerability score service 302 can calculate a vulnerability score of the workload to be placed on a host. The workload can be an application. The vulnerability of the workload to be placed and/or the underlying host can be calculated based on the impact of a known security flaw. For example, known security flaws can be any flaw from the Common Vulnerability and Exposures (CVE), which is a list of publicly disclosed cybersecurity security flaws. In some embodiments, Common Vulnerability Scoring System (CVSS) score is being utilized to assess such CVE. Specifically, the CVSS score ranges from 0 to 10, and a higher score indicates a more severe vulnerability. In some embodiments, the vulnerability score of the workloads can be calculated based on CVE of vulnerable packages detected on the workloads. There are different versions of CVSS score, and the vulnerability score service 302 may be calculated using the most recent version. For example, when both CVSS version 2 score and CVSS version 3 score is available for a CVE, the CVSS version 3 score will be utilized first.

When calculating the vulnerability score, the vulnerability score service 302 can also consider other factors such as the vendor data. For example, the vendor data can be the CVE data included in the National Institute of Standards and Technology (NIST) National Vulnerability Database (NVD). In some embodiments, the network traffic monitoring system 100 or its system operator can adjust the final vulnerability score when there is an anomaly in the vendor data. For example, for some new vulnerabilities, it is common to have certain vendor data missing or inaccurate, and such adjustment of the final vulnerability score could be performed. In some embodiments, the vendor data of a given vulnerability can be updated periodically, such as every 24 hours.

The vulnerability score service 302 can calculate the final vulnerability score utilizing different formulae. In some embodiments, the final vulnerability score is inverse proportional to the severity of the CVSS score of the given vulnerability.

The process hash score service 304 can calculate a process hash score for a host. Specifically, the process hash score is an assessment of process binary hash or file hash consistency across workloads on a given host, or across multiple hosts. For example, all servers of a web server farm running APACHE cloned from the same setup configuration is expected to have the same hash for http binaries, which indicate the process binary hash consistency for the servers is high. On the contrary, one or a few of the servers having different hash for http binaries would indicate the process binary hash consistency for the servers is low. In some embodiments, the process hash score is proportional to the process binary hash consistency. In some embodiments, a lower process hash score might indicate that one or more process hashes are being blacklisted or are anomalous.

The attack surface score service 306 can calculate an attack surface score for both a host and a workload to be placed. An attack surface score can also be calculated for a group of hosts (e.g., when a workload is being executed on multiple hosts). The attack surface score measures the number of potential attack surfaces, such as unused open ports, of a host or a workload. Specifically, the attack surface score can be a function of unused open ports relative to total ports of a host or a workload, with a smoothing factor being applied. In this example, open ports without any traffic over the past two weeks are considered "unused open ports." Among the unused open ports, some ports have a higher potential risk of being under attack, such as well-known ports that have been used in past attacks.

In one example, the following formula can be used to calculate the attack surface score.

$$\text{Attack surface score} = \frac{\alpha + \sum \text{used open ports}}{\alpha + \sum \text{open ports} + (\rho * \sum \text{unused common attack ports}) + f_v(\text{vulnerability pkgs})} \quad (1)$$

$$f_v = \max\left(\left\{cve_{score} = \begin{cases} CVSS_{V3}, & v3 \text{ exist} \\ CVSS_{V2}, & v3 \text{ not exist} \end{cases}\right\}\right)$$

In formula (1), a represents a smoothing factor that can be predetermined by the network traffic monitoring system 100 or its system operator; p represents a penalty factor which can also be predetermined by the network traffic monitoring system 100 or its system operator. For example, having well-known ports that have been used in past attacks can add an extra penalty factor to formula (1).

In some embodiments, the attack surface score service 306 can calculate an attack surface score for a host by using the average of the attack surface scores of workloads that are placed onto the host. In some embodiments, the attack surface score service 306 can calculate the attack surface score based on past data, such as data from the past 2 weeks.

In some embodiments, the attack surface score service 306 can calculate the attack surface score periodically, such as every day.

The forensics score service 308 can calculate a forensics score for a host. The forensics score measures the impact of a security incident. The forensics score service can instruct, or include a set of computer-readable instructions that can be executed by engines 150 or its components, to monitor and alert possible security incidents. Specifically, the monitoring and alerting functions can be executed by the sensors 104 and 220. For example, the sensors 104 and 220 can capture real-time forensic events of the host. For another example, the sensors 104 and 220 can also comply with rules that are predetermined by the network traffic monitoring system 100 or its system operator. Examples of real-time forensic events include executables creating a child process, a privilege escalation (such as a user ID executes a "sudo su" command), and hidden commands in bash_profile or bashrc.

In one example, the following formula can be used to calculate the forensics score for the host:

$$\text{forensics score} = (0, (100 - \Sigma \text{forensics event impact score})) \quad (2)$$

In formula (2), the forensics event impact score can be calculated first by the engine 150. The final forensics score can be an inverse function of the forensics event impact score. In one example, a forensic event can be based on a MITRE ATT&CK Evaluation. The MITRE ATT&CK Evaluation of the host can be scored with a static impact score from 0 to 100. For example, the higher the impact from the MITRE ATT&CK, the higher would be the forensic event impact score, which based on Formula (2) means the lower would be the forensic score.

The network anomaly score service 310 can calculate a network anomaly score for a host. The network anomaly score measures the severity of a data leak event happened at the host.

In one example, the following formula can be used to calculate the network anomaly score (data leak score):

$$\text{data leak score} = \max(0, (100 - \Sigma \text{data leak event severity score})) \quad (3)$$

In formula (3), the network anomaly score is an inverse function of the data leak event severity score, which measures how severe a data leak event is. In one example, a data leak event severity score can be determined as a ratio of total bytes transmitted to total bytes received with retransmissions accounted for. The data leak event severity score can be calculated first by the engine 150. Specifically, a lower score may indicate an unusually high amount of data is being transferred out of certain workloads on the host. A lower score might also indicate that the network anomaly forensic rule is incorrect. Network anomaly forensic rules can prohibit anomaly forensic events such as an abnormal number of traffic flows to a Domain Name Server (DNS), an abnormal number of traffic flows to a Network Time Protocol (NTP) server, etc.

The segmentation compliance score service 312 can calculate a segmentation compliance score for a host. The segmentation compliance score measures policy violations. Specifically, the segmentation compliance score presents a top-level view of all policy violations and highlights the area having the most violations. The segmentation compliance score can be calculated for a primary workspace of the host depending on whether there is a unified security policy being enforced. For example, when there is no unified security policy for the whole primary workspace, the segmentation compliance score can be calculated as an average of all compliance scores of each network segment of the host.

In one example, the following formula can be used to calculate the segmentation compliance score (compliance score):

$$\text{compliance score} = 100 - \left\lfloor \frac{100 \times (\text{escaped} + \text{misdropped})}{\text{permitted}} \right\rfloor \quad (4)$$

In formula (4), (escaped+misdropped) represents the number of policy violations, such as escaped flows or incorrectly dropped (misdropped) flows. Permitted represents the number of permitted traffic. In the example with no unified security policy for the whole primary workspace, such a formula can be utilized to calculate the segmentation compliance score of each network segment. A lower segmentation compliance score can indicate a significant number of policy violations relative to the permitted traffic within the host, or within the network segment. The segmentation compliance score can be 0 when the policy violations are more than the permitted traffic within the host, or within the network segment.

Each of the vulnerability score service 302, process hash score service 304, attack surface score service 306, forensics score service 308, network anomaly score service 310, and segmentation compliance score service 312 can send the corresponding result determined as described above, to the security score service 320. The security score service 320 can calculate an overall security score of a host based on each of the above-described scores that correspond to each of the above services. With such an overall security score for the host, an objective score reflective of the security posture of a host can be determined, which can then be relied upon for selecting a host for application placement. When generating the security posture score, the security score service 320 can also take into consideration other factors, including, but not limited to, the specific geo-location information of the host. For example, the security score service 320 can increase the security score for a host that is not located in countries sanctioned under regulations such as Office of Foreign Assets Control (OFAC), EU Embargo, or UN Embargo.

The security score service 320 can send the security posture score of the host to the application placement engine.

In one example, the following formula can be used to calculate the security score of a host:

$$\text{Overall score} = \frac{\sum W_{category} \times Score_{category}}{\sum W_{category}} \quad (5)$$

In formula (5), $Score_{category}$ represents one of the above described specific scores including the vulnerability score, the process hash score, the attack surface score, the forensics score, the network anomaly score, and the segmentation compliance score. In some embodiments, when any of the above described specific scores is non-applicable for a host, that specific score is considered as a 0 when calculating the overall security score. $W_{category}$ represents an adjustable weight that is being applied to a corresponding one of the above described specific scores described above. The weight $W_{category}$ can be adjusted by a system operator and/or a machine learning process may be deployed with appropriate weights being learned over time from system performance and operator inputs and thus can eventually be determined automatically by the system.

The application placement engine 330 can select a host from the number of hosts based on the security score of each of these hosts and other criteria. The application placement engine 330 can be one of the engines 150, or part of the analytics engine 110. In some embodiments, the application placement engine 330 can select a host from a pool of candidate hosts based on a security posture score generated using some or all of the scores calculated by the vulnerability score service 302, process hash score service 304, attack surface score service 306, forensics score service 308, network anomaly score service 310, and segmentation compliance score service 312. This host selection process will be described below with regard to FIG. 4.

After the selection, the application placement engine 330 transmits the information regarding the selected host to the application deployment engine 340.

The application deployment engine 340 can deploy workloads and applications onto the host selected by the application placement engine 330. In some embodiments, the application deployment engine 340 can include an orchestration system such as Kubernetes to automatically deploy the workloads and applications. In some embodiments, a system operator can manually deploy the workloads and applications utilizing the application deployment engine 340. Specifically, a set of candidate hosts can be presented through a user interface on a terminal to a system operator, and the system operator can select one or multiple hosts from the candidate hosts via the terminal. When presenting the candidate hosts, corresponding information such as scores generated by the vulnerability score service 302, process hash score service 304, attack surface score service 306, forensics score service 308, network anomaly score service 310, segmentation compliance score service 312, and security score service 320 can be also presented for the system operator to estimate a security posture of each of the candidate hosts, and make an informed decision.

Figure 4:
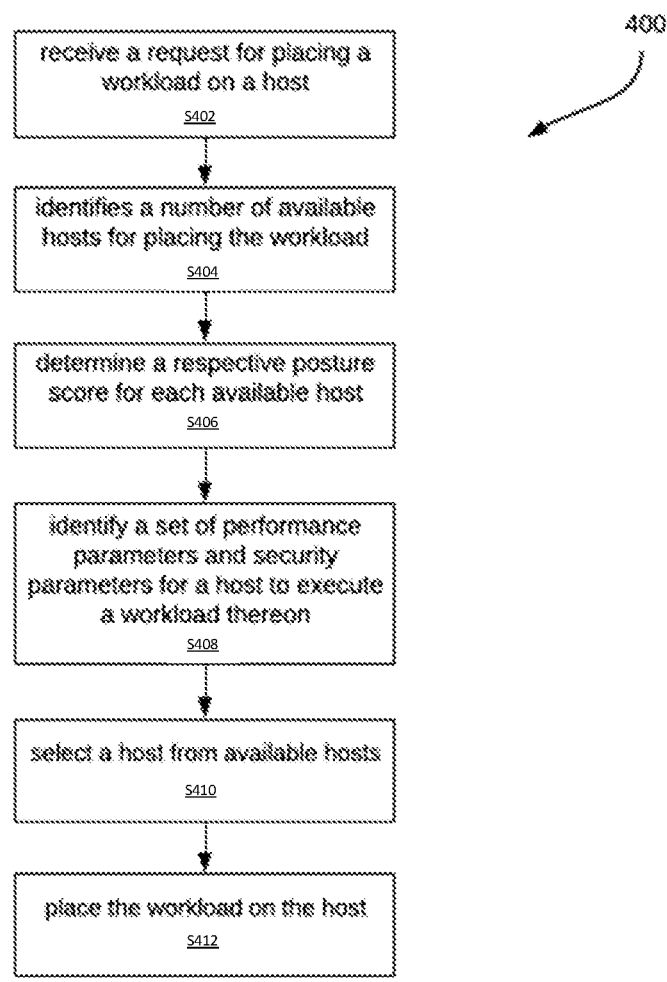
FIG. 4 illustrates an example of a method for application placement based on selection criteria and security posture of the host, according to one aspect of the present disclosure.

FIG. 4 illustrates an example of a method for application placement based on selection criteria and security posture of the host, according to one aspect of the present disclosure. Process of FIG. 4 will be described from the perspective of analytics engine 110 of FIG. 1, implementing functionalities of security score service 320, application placement engine 330 and application deployment engine 340. However, it should be understood that analytics engine 110 may have one or more processors executing computer-readable instructions stored on an associated memory to implement the process 400 of FIG. 4.

At S402, analytics engine 110 may receive a request for placing a workload on a host. Such request may be received from a network operator or a system orchestrator such as Kubernetes. For example, when installing a software, an indication of a workload to be placed can be transmitted to Kubernetes or ANSIBLE associated with the analytics engine 110. Such indication may be transmitted as part of a Yet Another Markup Language (YAML) spec.

At S404, analytics engine 110 identifies a number of available hosts (candidate hosts) for placing the workload thereon.

At S406, analytics engine 110 can determine a respective posture score (security posture score) for each one of the number of available hosts for hosting a workload. This posture score can include a security score that provides a quantified measurement of the host-specific performance and security assessment, as described above with reference to FIG. 3. In some embodiments, this security score can consider different security factors of the host. For example, some of the scores calculated by the vulnerability score service 302, process hash score service 304, attack surface score service 306, forensics score service 308, network anomaly score service 310, and segmentation compliance score service 312 can be utilized to calculate this security score of the host. For another example, the security score calculated by the security score service 320 is based on all the scores calculated by the vulnerability score service 302, process hash score service 304, attack surface score service 306, forensics score service 308, network anomaly score service 310, segmentation compliance score service 312, and security score service 320. For yet another example, the security score calculated by the security score service 320 can also reflect the specific geo-location risk of the host.

The posture score can also include a neighborhood security score that provides a quantified measurement of a corresponding neighborhood security assessment for a host. A host can be considered in the same neighborhood as another host if the number of network connections, i.e. hops, between the host and the other host equals or is less than a set number, such as 1. For a given host, it can have two different neighborhoods for inbound traffic or outbound traffic. For example, host A is an inbound neighbor of host B but not an outbound neighbor of host B, because there is only a single network connection between hosts A and B for inbound traffic whereas there is more than a set number of connections between hosts A and B for outbound traffic.

A neighborhood security assessment measures the security and vulnerability of the neighboring hosts of a given host. Specifically, some or all of the scores calculated by the vulnerability score service 302, process hash score service 304, attack surface score service 306, forensics score service 308, network anomaly score service 310, and segmentation compliance score service 312 can be utilized to measure the security of each of the neighboring hosts. In some embodiments, the vulnerability score can be used to measure the vulnerability of a given neighboring host. Such a neighborhood security assessment of a host can be important when calculating the overall security score of the host because it considers the security impact of neighboring hosts.

When being presented separately from the security score of the host, the neighborhood security assessment can also be presented as a graphical notation of communication patterns between hosts via a user interface. Specifically, the hosts within the same neighborhood are displayed together as a group, with the color of each host represents its security score. For example, green color can indicate a host has a high-security score but red color can indicate a host has a low-security score. In this example, a neighborhood graph with red-colored host in it can be considered as an unsecured neighborhood of hosts. This graphical representation of the hosts and their security measurements is can help the users to identify potential unsecured neighborhood or unsecured neighboring hosts in a straightforward fashion.

At S408, analytics engine 110 identifies a set of performance parameters and security parameters for a host in an enterprise network to execute a workload thereon. This set of performance parameters and security parameters can be provided to analytics engine 110 as input via dashboard or can be learned by the system overtime based on applications associated with the workload. The set of performance parameters and security parameters can identify a desired processing capacity, a desired host availability, and a desired security specification for the host. For example, the set of performance parameters and security parameters can identify the following criteria for a host or any combination of hosts: at least 300 Gigabytes total processing capacity, available for at least 6 months from today, and having a security score of 75 or above. In some embodiments, a more specific set of performance parameters and security parameters can be identified. For example, a user can identify the following criteria for a host or any combination of hosts: having the lowest attack surface score among the available hosts, and all neighboring hosts having security scores of 75 or above.

The set of performance parameters and security parameters for a host can be input manually or pre-determined. Specifically, the set of performance and security parameters can be received via a terminal coupled to the enterprise network. For example, a network operator can input a desired set of performance and security parameters through a user interface of the application placement system 300. The set of performance and security parameters can also be automatically set by a network orchestrator. For example, a network orchestrator can configure the set of performance and security parameters based on a user input or an enterprise network information. In this example, a network operator can also change the set of performance and security parameters after the automatic configuration.

At S410, analytics engine 110 selects a host from among the candidate hosts having a security posture (as determined per S406 and as described above with reference to FIG. 3) matching the performance parameters and the security parameters for executing the workload. In some embodiments, the selection result can include a group of qualified hosts that match the identified performance parameters and the security parameters. For example, a user interface of the application placement system 300 presents the group of qualified hosts for selection on a terminal coupled to the enterprise network, and the user interface can receive a selection of one or more host from the qualified hosts via the terminal.

At S412, analytics engine 110 places the workload on the selected host. For example, the application deployment engine 340 can deploy the workload on the host selected at S406. For another example, after the host has been selected at S406, a system operator can manually deploy the workload on the selected host.

With examples of a network monitoring system, a network environment and an application placement system described with reference to FIGS. 1-4, the disclosure now turns to FIGS. 5A and 5B for description of example system architectures for implementing analytics engine 110 and/or other components of systems described above.

Figure 5A:
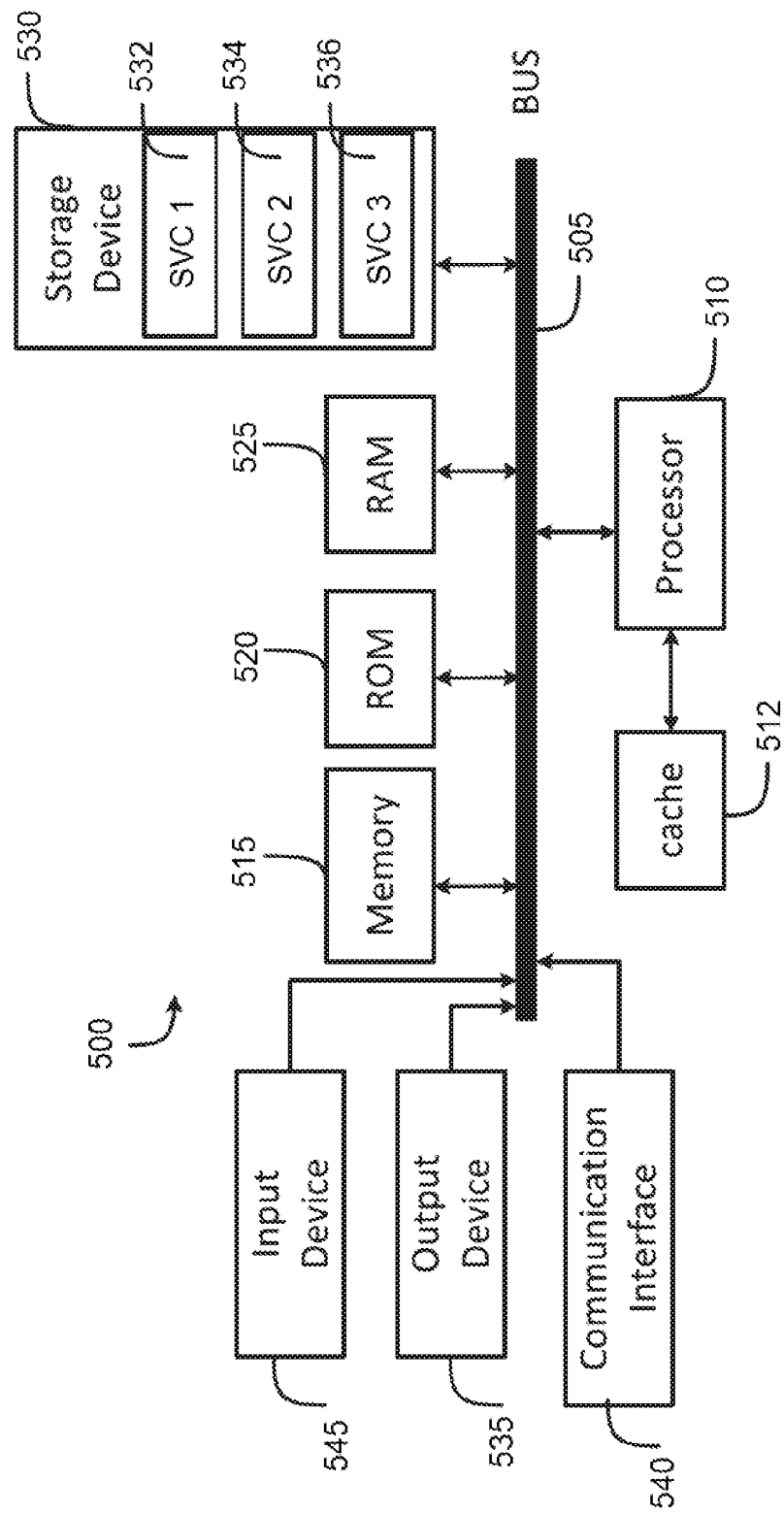
FIGS. 5A and 5B illustrate examples of systems, according to one aspect of the present disclosure.
Figure 5B:
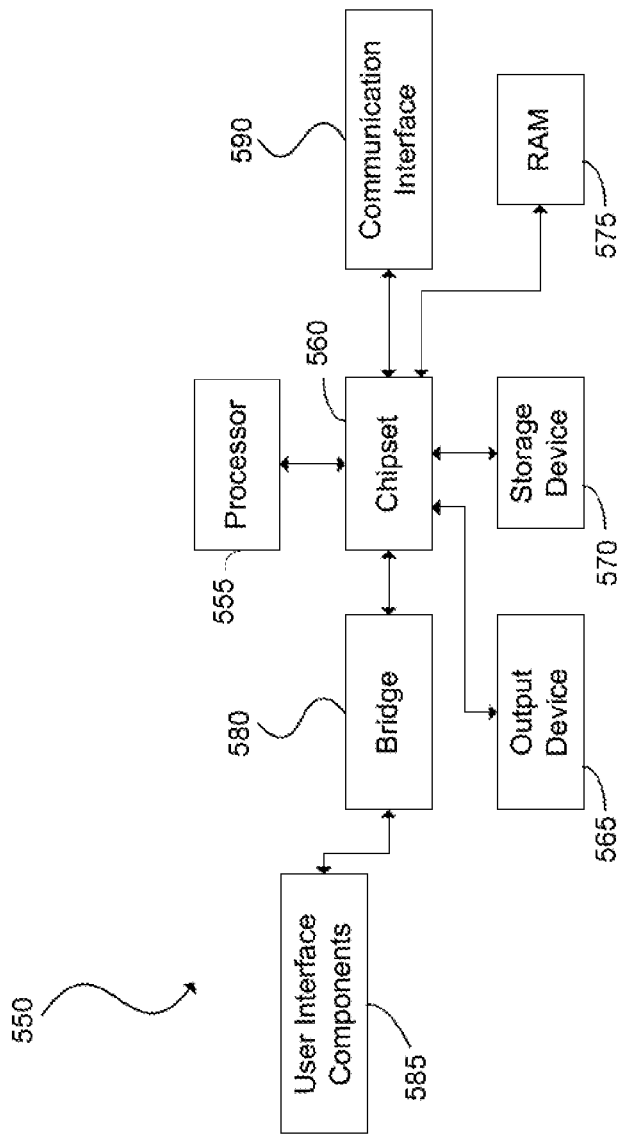

FIG. 5A and FIG. 5B illustrate examples of systems, according to one aspect of the present disclosure. The more appropriate system will be apparent to those of ordinary skill in the art when practicing the various embodiments. Persons of ordinary skill in the art will also readily appreciate that other systems are possible.

FIG. 5A illustrates an example architecture for a bus computing system 500 wherein the components of the system are in electrical communication with each other using a bus 505. The computing system 500 can include a processing unit (CPU or processor) 510 and a system bus 505 that may couple various system components including the system memory 515, such as read-only memory (ROM) in a storage device 570 and random access memory (RAM) 575, to the processor 510. The computing system 500 can include a cache 512 of high-speed memory connected directly with, in close proximity to, or integrated as part of the processor 510. The computing system 500 can copy data from the memory 515 and/or the storage device 530 to the cache 512 for quick access by the processor 510. In this way, the cache 512 can provide a performance boost that avoids processor delays while waiting for data. These and other services can control or be configured to control the processor 510 to perform various actions. Other system memory 515 may be available for use as well. The memory 515 can include multiple different types of memory with different performance characteristics. The processor 510 can include any general-purpose processor and a hardware module or software service, such as service1 532, service2 534, and service3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing system 500, an input device 545 can represent any number of input mechanisms, such as a microphone for speech, a touch-protected screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing system 500. The communications interface 540 can govern and manage the user input and system output. There may be no restriction on operating on any particular hardware arrangement and therefore the basic features here may easily be substituted for improved hardware or firmware arrangements as they are developed.

Storage device 530 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software services 532, 534, 536 for controlling the processor 510. Other hardware modules or software services are contemplated. The storage device 530 can be connected to the system bus 505. In one aspect, a hardware module that performs a particular function can include the software component stored in a computer-readable medium in connection with the necessary hardware components, such as the processor 510, bus 505, output device 535, and so forth, to carry out the function.

FIG. 5B illustrates an example architecture for a chipset computing system 550 that can be used in accordance with an embodiment. The computing system 550 can include a processor 555, representative of any number of physically and/or logically distinct resources capable of executing software, firmware, and hardware configured to perform identified computations. The processor 555 can communicate with a chipset 560 that can control input to and output from the processor 555. In this example, the chipset 560 can output information to an output device 565, such as a display, and can read and write information to storage device 570, which can include magnetic media, and solid state media, for example. The chipset 560 can also read data from and write data to RAM 575. A bridge 580 for interfacing with a variety of user interface components 585 can be provided for interfacing with the chipset 560. The user interface components 585 can include a keyboard, a microphone, touch detection and processing circuitry, a pointing device, such as a mouse, and so on. Inputs to the computing system 550 can come from any of a variety of sources, machine generated and/or human generated.

The chipset 560 can also interface with one or more communication interfaces 590 that can have different physical interfaces. The communication interfaces 590 can include interfaces for wired and wireless LANs, for broadband wireless networks, as well as personal area networks. Some applications of the methods for generating, displaying, and using the GUI disclosed herein can include receiving ordered datasets over the physical interface or be generated by the machine itself by processor 555 analyzing data stored in the storage device 570 or the RAM 575. Further, the computing system 500 can receive inputs from a user via the user interface components 585 and execute appropriate functions, such as browsing functions by interpreting these inputs using the processor 555.

It will be appreciated that computing systems 500 and 550 can have more than one processor 510 and 555, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
  determining a respective security posture score for each of a plurality of candidate hosts of an enterprise network, the security posture score for a first host of the candidate hosts being based on a combination of:
    a process hash score as an assessment of process binary hash or file hash consistency across workloads on the first host, or across multiple hosts of the candidate hosts;
    an attack surface score for both the first host and a workload to be placed that measures a number of potential attack surfaces of the first host or the workload;
    a forensics score for the first host that measures the impact of a security incident at the first host;
    a network anomaly score for the first host that measures the severity of a data leak event at the first host; and
    a segmentation compliance score for the first host that measures any policy violations associated with candidate host;
  identifying a set of performance parameters and security parameters for a host in the enterprise network to execute a workload thereon;
  selecting a host from the plurality of candidate hosts having a security posture score matching the performance parameters and the security parameters for executing the workload; and
  placing the workload on the host.

2. The method of claim 1, wherein the respective security posture for each of the plurality of candidate hosts is determined based on one or more of a number of open ports for a corresponding candidate host, current or scheduled processes executed on the corresponding candidate host, geo-specific risks associated with the corresponding candidate host, flows associated with the corresponding candidate host and a security score of the corresponding candidate host.

3. The method of claim 1, wherein the respective security posture score for each of the plurality of candidate hosts is further determined based on a corresponding neighborhood security assessment of a neighborhood associated with a candidate host.

4. The method of claim 1, wherein the set of performance parameters and security parameters identify a desired processing capacity, a desired host availability and a desired security specification for the host.

5. The method of claim 1, wherein identifying the set of performance and security parameters comprises receiving the set of performance and security parameters via a terminal coupled to the enterprise network.

6. The method of claim 1, wherein identifying the set of performance and security parameters is automatically determined.

7. The method of claim 1, further comprising:
presenting a set of candidate hosts for selection on a terminal coupled to the enterprise network; and
receiving a selection of the host via the terminal.

8. An application placement system comprising:
one or more processors; and
at least one non-transitory computer-readable storage medium having stored therein instructions which, when executed by the one or more processors, cause the one or more processors to:
determine, by a security score service, a respective security posture score for each of a plurality of candidate hosts of an enterprise network, the security posture score for a first host of the candidate hosts being based on a combination of:
a process hash score as an assessment of process binary hash or file hash consistency across workloads on the first host, or across multiple hosts of the candidate hosts;
an attack surface score for both the first host and a workload to be placed that measures a number of potential attack surfaces of the first host or the workload;
a forensics score for the first host that measures the impact of a security incident at the first host a network anomaly score for the first host that measures the severity of a data leak event at the first host; and
a segmentation compliance score for the first host that measures any policy violations associated with candidate host;
identify, by a user, a set of performance parameters and security parameters for a host in the enterprise network to execute a workload thereon;
select, by an application placement engine, a host from the plurality of candidate hosts having a security posture score matching the performance parameters and the security parameters for executing the workload; and
place, by an application deployment engine, the workload on the host.

9. The application placement system of claim 8, wherein respective security posture for each of the plurality of candidate hosts is determined based on one or more of a number of open ports for a corresponding candidate host, current or scheduled processes executed on the corresponding candidate host, geo-specific risks associated with the corresponding candidate host, flows associated with the corresponding candidate host and a security score of the corresponding candidate host.

10. The application placement system of claim 8, wherein the respective security posture score for each of the plurality of candidate hosts is further determined based on a corresponding neighborhood security assessment of a neighborhood associated with a candidate host.

11. The application placement system of claim 8, wherein the set of performance parameters and security parameters identify a desired processing capacity, a desired host availability and a desired security specification for the host.

12. The application placement system of claim 8, wherein the instructions which, when executed by the one or more processors, further cause the one or more processors to:
receive the set of performance and security parameters via a terminal coupled to the enterprise network.

13. The application placement system of claim 8, wherein identify the set of performance and security parameters is automatically determined.

14. The application placement system of claim 8, wherein the instructions which, when executed by the one or more processors, further cause the one or more processors to:
presenting a set of candidate hosts for selection on a terminal coupled to the enterprise network; and
receiving a selection of the host via the terminal.

15. A non-transitory computer-readable storage medium comprising instructions which, when executed by one or more processors of an application placement system, cause the application placement system to:
determine a respective security posture score for each of a plurality of candidate hosts of an enterprise network, the security posture score for a first host of the candidate hosts being based on a combination of:
a process hash score as an assessment of process binary hash or file hash consistency across workloads on the first host, or across multiple hosts of the candidate hosts;
an attack surface score for both the first host and a workload to be placed that measures a number of potential attack surfaces of the first host or the workload;
a forensics score for the first host that measures the impact of a security incident at the first host;
a network anomaly score for the first host that measures the severity of a data leak event at the first host; and
a segmentation compliance score for the first host that measures any policy violations associated with candidate host;
identify a set of performance parameters and security parameters for a host in the enterprise network to execute a workload thereon;
select a host from the plurality of candidate hosts having a security posture score matching the performance parameters and the security parameters for executing the workload; and
place the workload on the host.

16. The non-transitory computer-readable storage medium of claim 15, wherein the respective security posture for each of the plurality of candidate hosts is determined based on one or more of a number of open ports for a corresponding candidate host, current or scheduled processes executed on the corresponding candidate host, geo-specific risks associated with the corresponding candidate host, flows associated with the corresponding candidate host and a security score of the corresponding candidate host.

17. The non-transitory computer-readable storage medium of claim 15, wherein the respective security posture score for each of the plurality of candidate hosts is further determined based on a corresponding neighborhood security assessment of a neighborhood associated with a candidate host.

18. The non-transitory computer-readable storage medium of claim 15, wherein the set of performance parameters and security parameters identify a desired processing capacity, a desired host availability and a desired security specification for the host.

19. The non-transitory computer-readable storage medium of claim 15, wherein execution of the instructions by the one or more processors further cause the application placement system to:
receive the set of performance and security parameters via a terminal coupled to the enterprise network.

20. The non-transitory computer-readable storage medium of claim 15, wherein identify the set of performance and security parameters is automatically determined.

\* \* \* \* \*